Patented Mar. 30, 1937

2,075,575

UNITED STATES PATENT OFFICE 2,075,575

PROCESS FOR POLYMERIZING VINYL COMPOUNDS

Stuart D. Douglas, Charleston, W. Va., assignor, by mesne assignments, to Union Carbide and Carbon Corporation, a corporation of New York No Drawing. Application January 29, 1932, Serial No. 589,774

3 Claims. (Cl. 260—2)

The invention is a process for polymerizing vinyl compounds, and broadly comprises a method for accelerating the action of oxygen-producing catalysts which are used in the polymerization of vinyl compounds. As a result of my improved process more satisfactory resinous products are obtained in a more economical manner than by known methods.

As is known, vinyl compounds are adapted to the production of resinous products (vinyl resins) for which various uses have been proposed. The known processes for effecting such polymerizations include treatment with heat, actinic light, or a catalyst, or with a combination of these methods. Various catalysts have been suggested for the purpose of promoting the polymerization of vinyl compounds, and of these certain compounds containing loosely-bound oxygen, such, for example, as dibenzoyl peroxide, have been most generally accepted for the purpose.

The prior methods of using catalysts of the peroxide type are attended with certain difficulties. For example, when a batch of vinyl compounds to be polymerized is mixed with the catalyst and brought to the polymerization temperature, a period of inactivity generally precedes the initiation of the polymerizing reaction. This inert period may be due to the fact that more or less time is required for the peroxide to begin to liberate the "nascent" oxygen presumably required to promote the polymerization. While I believe this to be the true explanation, it is understood that the invention is not to be restricted by any theory advanced herein.

Furthermore, any undecomposed catalyst remaining in the polymerized product must be eliminated in order that subsequent reaction of this catalytic residue will not produce undesirable changes in the product. For this reason it is preferable to use a catalyst which is consumed in the polymerization process as completely as possible so that the amount of residual catalyst will be a minimum.

I have discovered that the activity of peroxide polymerization catalysts, particularly dibenzoyl peroxide, can be greatly increased, and their decomposition accelerated by the addition of small amounts of an organic acid or acid anhydride to the reaction in which the catalyst is used. The acid or acid anhydride assists in effecting the polymerization of vinyl compounds in less time; and it improves the resin produced by reducing the amount of catalytic residue contained in the product.

For example, improved resins may be produced from vinyl halides such as vinyl chloride, vinyl esters of aliphatic acids such as vinyl acetate, vinyl propionate, vinyl butyrate etc., other vinyl derivatives, e. g. vinyl benzene (styrene), or related vinyl compounds, or other vinyl compounds, or from a mixture of a plurality of such vinyl derivatives, with the use of a peroxide catalyst in less time if from about 0.25% to about 2.0% (based on the weight of vinyl compounds) of an acid, such as acetic acid, or an acid anhydride, such as acetic anhydride, is added to the compounds to be polymerized. In general, the polymerization should be conducted at a temperature below about 60° C.

The following is a description of two methods of practicing the invention. The parts are by weight.

A mixture of 200 parts of vinyl chloride, 50 parts of vinyl acetate, 250 parts of acetone and 2.5 parts of dibenzoyl peroxide was charged into an autoclave. To this mixture was added 2.5 parts of glacial acetic acid. The autoclave and its contents were heated to 40° C. and kept at this temperature until the polymerization reaction had practically stopped, or about 33 hours.

A mixture of 200 parts of vinyl chloride, 50 parts of vinyl acetate, 250 parts of acetone and one part of acetyl benzoyl peroxide was charged into an autoclave. To this mixture were added 1.25 parts of acetic anhydride. The autoclave and its contents were heated to 35° C. and kept at this temperature until the polymerization reaction had practically stopped, or about 48 hours.

These polymerizations proceeded more swiftly to completion, and the resulting resin was more nearly free from residual peroxide than similar polymerizations in which no acid or acid anhydride was used.

It is obvious that many modifications of the process are possible. For example, organic acids other than acetic acid may be used, including benzoic acid, oxalic acid and related acids. Similarly, organic acid anhydrides other than acetic anhydride may be used. Also, the process may be used with any peroxide catalyst. Diacetyl peroxide and acetyl benzoyl peroxide are examples of other catalysts which are benefited by the addition of acids as described herein. I prefer to use organic acids or anhydrides which are comparable in strength to those named, and to use those acids or anyhdrides which will not seriously interfere with or be affected by the vinyl compounds or solvents which are present in the process. The term "organic acid" as used in the appended claims will be understood to include organic acid anhydrides.

I claim:

1. Process which consists in conjointly polymerizing vinyl halides with vinyl esters of aliphatic acids in the presence of an organic peroxide polymerization catalyst and a small quantity of an organic acid at a temperature below 60° C.

2. Process which consists in conjointly polymerizing vinyl halides with vinyl esters of aliphatic acids in the presence of an organic peroxide polymerization catalyst and about 0.25% to about 2.0% of an organic acid at a temperature below 60° C.

3. Process which consists in conjointly polymerizing vinyl halide with vinyl acetate in the presence of a benzoyl peroxide and a small quantity of acetic acid at a temperature of about 35° to 40° C.

STUART D. DOUGLAS.